W. H. WILSON.
LATERAL MOTION CAR TRUCK.
APPLICATION FILED JUNE 23, 1913.
1,117,294.
Patented Nov. 17, 1914.
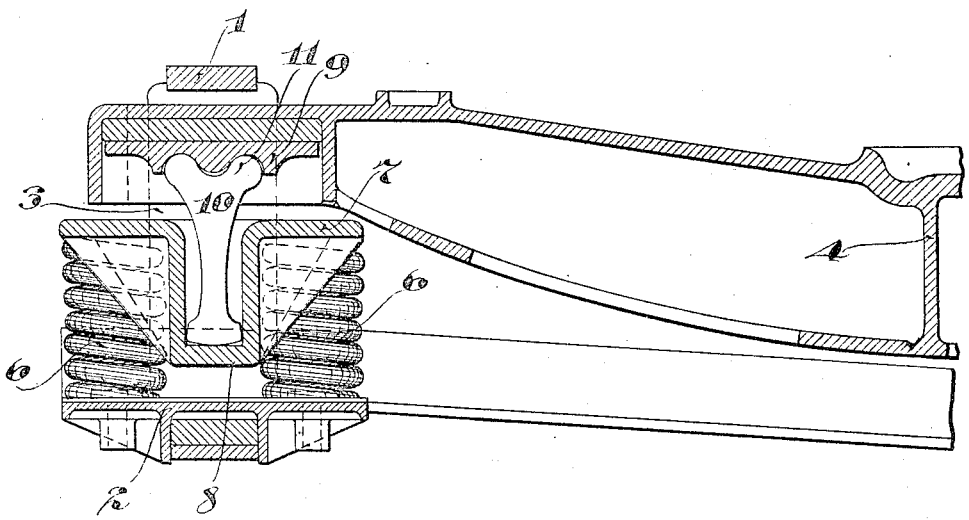
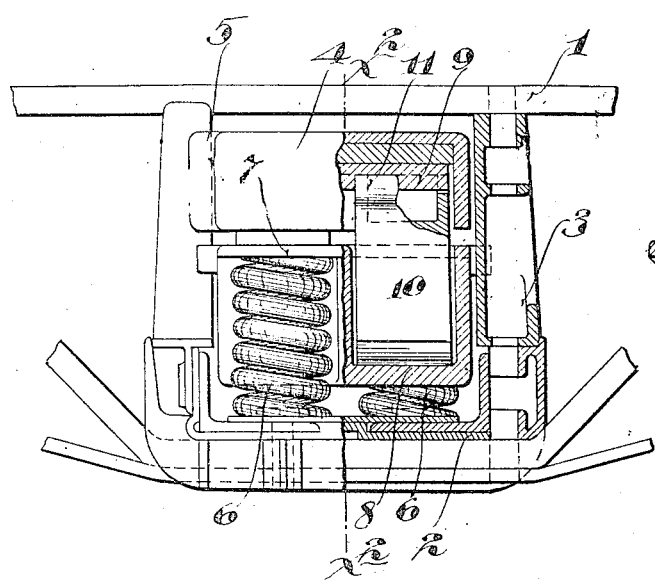
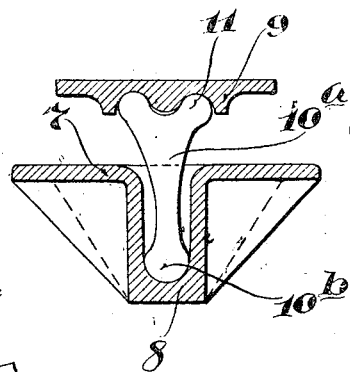
Witnesses:
E. C. Skinkle
Geo. Knutson
Inventor
W. H. Wilson
By his Attorneys
Williamson Merchant

UNITED STATES PATENT OFFICE.

WILLIAM H. WILSON, OF ST. PAUL, MINNESOTA.

LATERAL-MOTION CAR-TRUCK.

1,117,294.           Specification of Letters Patent.        Patented Nov. 17, 1914.

Application filed June 23, 1913.  Serial No. 775,198.

*To all whom it may concern:*

Be it known that I, WILLIAM H. WILSON, a citizen of the United States, residing at St. Paul, in the county of Ramsey and State of Minnesota, have invented certain new and useful Improvements in Lateral-Motion Car-Trucks; and I do hereby declare the following to be a full, clear, and exact description of the invention, such as will enable others skilled in the art to which it appertains to make and use the same.

Particularly, my invention relates to car trucks of the type wherein provision is made for lateral motion of the car body in respect to the truck frames, and has for its object to improve the same in the several particulars hereinafter noted.

As is well known, the greatest cause of excessive wear of the wheel flanges of car trucks is due to the bolster being out of center and of the wheel flanges being thrust against the rails excessively in rounding curves. Numerous lateral motion devices have been disclosed in patents, and some put into actual use, for preventing such excessive wear of the wheel flanges. The chief defect in prior lateral motion devices is that normally, they offer very slight resistance to movements of the truck bolster out of center, so that a constant swaying or slight lateral vibratory movement of the truck wheels is permitted, even when running on straight or nearly straight tracks, and when there is no occasion for such lateral movements, but when, on the contrary, better running action would be produced by holding the truck bolster centered.

I correct the above noted defects in the lateral motion devices of car trucks by the use of so-called three-point rockers which are interposed between suitable lower and upper bearings applied, respectively, to the trucks and to the truck bolsters or other parts which move with the car body transversely of the truck. These three-point-contact rockers are gravity-held with all three contact points sustaining the load weight under all normal conditions. In rounding a curve, the wheel flanges first feel the force of the change in direction, and unless this force be properly absorbed through the truck, the wear on the wheel flanges, rail and couplers, will be excessive and the life of the said parts will be shortened. The three-point bearings or rockers, as indicated, maintain their normal position in rounding moderate curves at ordinary freight speed. If, however, the lateral force is greater than that ordinarily met with, the three-point rockers will oscillate from normal intermediate positions and permit as much more lateral play of the truck bolster, as may be required to absorb the shock or lateral strain, and prevent the wheel flanges from being forced excessively against the rails.

Generally stated, the invention consists of the novel devices and combinations of devices illustrated, described and defined in the claims.

In the accompanying drawings wherein several forms of the present invention are illustrated, like characters indicate like parts throughout the several views.

Referring to the drawings:—Figure 1 is a view in side elevation showing portions of a car truck having my invention incorporated therein, some parts being sectioned; Fig. 2 is a transverse vertical section taken on the line $x^2$ $x^2$ on Fig. 1, some parts being broken away; and Fig. 3 is a sectional view illustrating a slightly modified form of the rocker illustrated in Figs. 1 and 2.

In so far as my present invention is concerned, the truck frame may be of any approved or suitable construction or type, and the same statement is true in respect to the truck bolster. In the particular form of the truck illustrated, however, the numeral 1 indicates the truck side frames which include saddle plates 2 and columns 3. The truck bolster is indicated as an entirety by the numeral 4. The bolster, as is usual, in this type of truck, works between the columns 3 and is provided with suitable stop lugs 5 that are adapted to engage the columns 3 to limit the endwise movements of the bolster transversely of the truck.

Groups of coiled springs 6, as shown, four in each group, are suitably seated on the saddle plates 2 of the truck side frames, and each group of springs supports a so-called lower rocker bearing 7. These lower rocker bearings 7 are provided, between the inside and outside springs 6, with depending pockets 8. These lower rocker bearings are guided for vertical movements on the columns 3, and partake of the lateral movements of the truck frame.

Upper rocker bearings 9 are, as shown, seated in suitable pockets in the ends of the bolster 4, so that they partake of the vertical movements of the bolster, and also of the lateral movements thereof, that is, the endwise movements of said bolster, transversely of the truck.

Three-point rockers 10, which are integral or solid metal structures, are interposed between the upper and lower bearings 7 and 9. These rockers 10 are preferably arranged in pairs, and their lower ends are seated on the flat bottoms of the pockets 8 of the lower rocker bearings 7. At their upper ends, the rockers 10 are provided with two-point contacts or bearing lugs 11 that normally engage seats in the under side of the upper rocker bearings 9. The bearing lugs 11 are, of course, on opposite sides of a vertical line drawn axially or centrally through the rocker. Preferably, the lower ends of the rockers 10 are somewhat flattened, by a curve of much greater diameter than the transverse width of the lower end of said rocker. A three-point rocker of this character offers the greatest resistance to lateral movement, when in a central position, and this is a feature desired to give normal stability against continuous lateral swaying movement of the car body. Otherwise stated, with the said three-point rocker bearing, the resistance to lateral movement decreases as the rocker is oscillated in the one direction, or the other, from its normal or central position, and this decrease in resistance may be offset in part, when desired, by providing a type of curved lower end, above described, to the rocker. With such curved lower end on the rocker, the point of contact between the lower end of the rocker and the bottom of the pocket 8 of the lower rocker bearing 7, will travel as the rocker is oscillated, but at any and all times, the lower end of the said rocker will have but one point or line of contact with the said pocket bottom. The clearance between the upper walls of the pocket 8 and the intermediate portions of the rockers is preferably made such that the said rocker will engage therewith at the limit of extreme lateral movement of the truck bolster. In practice, I have found that these rockers, to be efficient, must have considerable length, and hence, to provide for these long rockers without raising the bolster or car body, I drop the rocker engaging surfaces of the lower rocker bearings between the bolster supporting springs, by forming the pockets 8 in the said lower bearings.

Fig. 3 illustrates a slightly modified form of the lower end portion of the rocker and of the bottom of the pocket of the lower rocker bearing, in which the rocker 10$^a$ is provided with an approximately semi-cylindrical lower end 10$^b$ that engages the corresponding formed surface on the bottom of said pocket.

It will, of course, be understood, that the car body, not shown, will partake of the lateral movements of the truck bolster. The said truck bolster, in a broad sense, is a body member, which in one way or another, supports or carries the car body.

What I claim is:

1. The combination with a truck frame and body member, of lower rocker bearings supported by said truck and provided with depressed rocker receiving pockets, upper rocker bearings partaking of the vertical and lateral movements of said body, and solid three-point rockers seated on the bottoms of the depressed portions of said lower bearings and supporting said upper bearings and yieldingly holding the said body member in an intermediate position.

2. The combination with a truck frame and a body member, of groups of springs on said truck frame, lower rocker bearings supported on said springs and having rocker receiving pockets extended downward between said springs, upper rocker bearings partaking of the vertical and lateral movements of said body member, and three-point rockers seated in the pockets of said lower rocker bearings and supporting said upper rocker bearings, and under the weight of the load, yieldingly holding said body member in an intermediate position, with a maximum resistance against lateral movement, at the point of rest.

3. The combination with a truck frame and a body member, of groups of springs supported on the sides of the truck frame, lower rocker bearings seated on said groups of springs for vertical movements but partaking of the lateral movements of said truck frame, said lower rocker bearings having lower receiving pockets that depend between said springs, upper rocker bearings partaking of the vertical and lateral movements of said body member, and solid three-point rockers having their lower ends seated in the bottoms of the pockets of said lower rocker bearings and having laterally spaced lugs at their upper ends, both normally engaging said upper rocker bearings, and yieldingly holding said body member in an intermediate position.

4. The combination with a truck frame and a body bolster, of rocker bearings spring supported for vertical movements on said truck and partaking of the lateral movements thereof, said bearings having depressed rocker receiving pockets, upper rocker bearings partaking of the vertical and lateral movements of said body member, and solid three-point rockers seated on the bottoms of the depressed pockets of said lower bearings and supporting said upper bearings, and under the weight of the load, yieldingly holding said body member in an intermediate position.

5. The combination with a truck frame and truck bolster, of groups of springs on said truck frame, lower rocker bearings supported on said springs and having rocker receiving pockets extending downward between said springs, upper rocker bearings partaking of the vertical and lateral movements of said bolster, and solid three-point rockers seated in the pockets of said lower rocker bearings and supporting said upper rocker bearings, and under the weight of the load, yieldingly holding said bolster in an intermediate position.

6. The combination with a truck frame and a body member, of groups of springs supported on the sides of the truck frame, lower rocker bearings seated on said groups of springs for vertical movements but partaking of the lateral movements of said truck frame, said lower rocker bearings having lower receiving pockets that depend between said springs, upper rocker bearings partaking of the vertical and lateral movements of said body member, solid three-point rockers having their lower ends seated in the bottoms of the pockets of said lower rocker bearings and having laterally spaced lugs at their upper ends, both normally engaging said upper rocker bearings, and yieldingly holding said body member in an intermediate position, the lower ends of said rockers being formed on curved lines which cause a shifting of the point of contact between said rockers and pockets when the said rockers are oscillated from their normal intermediate position.

7. The combination with a truck frame and a body member, of groups of springs on said truck frame, lower rocker bearings supported on said springs and having rocker receiving pockets extended downward between said springs, upper rocker bearings partaking of the vertical and lateral movements of said body member, and three-point rockers seated in the pockets of said lower rocker bearings and supporting said upper rocker bearings, and under the weight of the load, yieldingly holding said body member in an intermediate position, with a maximum resistance against lateral movement, at the point of rest, the said rockers being engagable with the upper portions of the said pockets under extreme movements from normal positions.

In testimony whereof I affix my signature in presence of two witnesses.

WILLIAM H. WILSON.

Witnesses:
A. J. PEARSON,
JOHN E. HURGERUH.